(12) United States Patent
Liu et al.

(10) Patent No.: US 11,314,973 B2
(45) Date of Patent: Apr. 26, 2022

(54) LANE LINE-BASED INTELLIGENT DRIVING CONTROL METHOD AND APPARATUS, AND ELECTRONIC DEVICE

(71) Applicant: SHANGHAI SENSETIME INTELLIGENT TECHNOLOGY CO., LTD., Shanghai (CN)

(72) Inventors: Wenzhi Liu, Shanghai (CN); Chendi Yu, Shanghai (CN); Guangliang Cheng, Shanghai (CN); Haibo Zhu, Shanghai (CN)

(73) Assignee: SHANGHAI SENSETIME INTELLIGENT TECHNOLOGY CO., LTD., Shanghai (CN)

( * ) Notice: Subject to any disclaimer, the term of this patent is extended or adjusted under 35 U.S.C. 154(b) by 15 days.

(21) Appl. No.: 16/886,163

(22) Filed: May 28, 2020

(65) Prior Publication Data
US 2020/0293797 A1   Sep. 17, 2020

Related U.S. Application Data

(63) Continuation of application No. PCT/CN2019/087622, filed on May 20, 2019.

(30) Foreign Application Priority Data

May 31, 2018   (CN) .......................... 201810551908.X

(51) Int. Cl.
*G06K 9/00* (2022.01)
*G06K 9/20* (2006.01)
(Continued)

(52) U.S. Cl.
CPC ....... *G06K 9/00798* (2013.01); *G06K 9/2054* (2013.01); *G06K 9/6232* (2013.01); *G08G 1/167* (2013.01)

(58) Field of Classification Search
None
See application file for complete search history.

(56) References Cited

U.S. PATENT DOCUMENTS

| 2009/0157247 A1* | 6/2009 | Sjogren | .................... B62D 1/28 701/23 |
| 2010/0002911 A1* | 1/2010 | Wu | ....................... B60W 30/12 382/104 |

(Continued)

FOREIGN PATENT DOCUMENTS

| CN | 101894271 A | 11/2010 |
| CN | 101915672 A | 12/2010 |

(Continued)

OTHER PUBLICATIONS

State Intellectual Property Office of the People's Republic of China, Office Action and Search Report Issued in Application No. 201810551908X, dated Apr. 15, 2020,18 pages.

(Continued)

*Primary Examiner* — Santiago Garcia

(57) ABSTRACT

Embodiments of the present disclosure disclose a lane line-based intelligent driving control method and apparatus, and an electronic device. The method includes: obtaining a lane line detection result of a vehicle traveling environment; determining, according to a traveling state of the vehicle and the lane line detection result, an estimated distance of traveling out of the lane line by the vehicle and/or estimated time of traveling out of the lane line by the vehicle; and performing intelligent driving control on the vehicle according to the estimated distance and/or the estimated time. The embodiments of the present disclosure implement lane line-based intelligent control on the vehicle traveling state, thereby helping to improve the driving safety.

18 Claims, 4 Drawing Sheets

(51) Int. Cl.
*G06K 9/62* (2022.01)
*G08G 1/16* (2006.01)

(56) References Cited

U.S. PATENT DOCUMENTS

| | | | |
|---|---|---|---|
| 2012/0320210 A1 | 12/2012 | Imai et al. | |
| 2013/0208945 A1 | 8/2013 | Nunn et al. | |
| 2015/0055831 A1 | 2/2015 | Kawasaki et al. | |
| 2015/0151725 A1* | 6/2015 | Clarke | B62D 15/0265 701/28 |
| 2015/0165973 A1 | 6/2015 | Takemae | |
| 2015/0166062 A1* | 6/2015 | Johnson | B60W 10/20 701/41 |
| 2015/0310282 A1* | 10/2015 | Sakamoto | G06K 9/00798 382/104 |
| 2016/0325753 A1* | 11/2016 | Stein | G06K 9/46 |
| 2017/0262705 A1 | 9/2017 | Li et al. | |
| 2017/0262735 A1 | 9/2017 | Ros Sanchez et al. | |
| 2017/0341645 A1 | 11/2017 | Sugita et al. | |
| 2017/0349173 A1* | 12/2017 | Nishiguchi | B62D 15/0255 |
| 2018/0134217 A1* | 5/2018 | Peterson | G08G 1/167 |
| 2018/0189578 A1* | 7/2018 | Yang | G06K 9/00798 |
| 2018/0231976 A1* | 8/2018 | Singh | B60W 30/12 |
| 2019/0212749 A1* | 7/2019 | Chen | G06K 9/6272 |
| 2019/0266418 A1* | 8/2019 | Xu | G06K 9/4604 |
| 2020/0041284 A1* | 2/2020 | Liu | G06T 7/0002 |
| 2020/0198648 A1* | 6/2020 | Ishioka | G05D 1/0061 |

FOREIGN PATENT DOCUMENTS

| | | |
|---|---|---|
| CN | 101966838 A | 2/2011 |
| CN | 103832433 A | 6/2014 |
| CN | 105320927 A | 2/2016 |
| CN | 107169468 A | 9/2017 |
| CN | 108875603 A | 11/2018 |
| JP | H09270098 A | 10/1997 |
| JP | 2003104147 A | 4/2003 |
| JP | 2010191893 A | 9/2010 |
| JP | 2013003913 A | 1/2013 |
| JP | 2013196341 A | 9/2013 |
| JP | 2017162456 A | 9/2017 |
| JP | 2017211909 A | 11/2017 |
| JP | 2019509566 A | 4/2019 |
| WO | 2013186903 A1 | 12/2013 |

OTHER PUBLICATIONS

International Search Report Issued in Application No. PCT/CN2019/087622, dated Aug. 20, 2019, 6 pages.
Chinese Office Action and Search Report Issued in Application No. 201810551908X, dated Dec. 3, 2020, 16 pages.
International Search Report and Written Opinion for PCT Application No. PCT/CN2019/087622, dated Aug. 20, 2019, 19 pages.
Japanese Office Action Issued in Application No. 2020-554361, dated Aug. 5, 2021, 10 pages.

* cited by examiner

US 11,314,973 B2

LANE LINE-BASED INTELLIGENT DRIVING CONTROL METHOD AND APPARATUS, AND ELECTRONIC DEVICE

CROSS-REFERENCE TO RELATED APPLICATION

The present application is a continuation of International Application No. PCT/CN2019/087622, filed on May 20, 2019, which claims priority to Chinese Patent Application No. CN201810551908.X, filed with the Chinese Patent Office on May 31, 2018, and entitled "LANE LINE-BASED INTELLIGENT DRIVING CONTROL METHOD AND APPARATUS, AND ELECTRONIC DEVICE", all of which are incorporated herein by reference in their entirety.

BACKGROUND

Lane line detection is a key technology in automatic driving and assisted driving. With this technology, lane lines on a road where a vehicle is traveling can be detected, thereby determining the current position of the vehicle and providing key information for next warning.

SUMMARY

The embodiments of the present disclosure provide a technical solution of lane line-based intelligent driving control.

The embodiments of the present disclosure provide a lane line-based intelligent driving control method, including:

obtaining a lane line detection result of a vehicle traveling environment;

determining, according to a traveling state of a vehicle and the lane line detection result, an estimated distance of traveling out of a lane line by the vehicle and/or estimated time of traveling out of the lane line by the vehicle; and performing intelligent driving control on the vehicle according to the estimated distance and/or the estimated time.

According to another aspect of the embodiments of the present disclosure, a lane line-based intelligent driving control apparatus is provided, including:

an obtaining module, configured to obtain a lane line detection result of a vehicle traveling environment;

a determination module, configured to determine, according to a traveling state of a vehicle and the lane line detection result, an estimated distance of traveling out of a lane line by the vehicle and/or estimated time of traveling out of the lane line by the vehicle; and a control module, configured to perform intelligent driving control on the vehicle according to the estimated distance and/or the estimated time.

According to yet another aspect of the embodiments of the present disclosure, an electronic device is provided, including:

a memory, configured to store a computer program; and a processor, configured to execute the computer program stored in the memory, wherein when the computer program is executed, the method according to any one of the foregoing embodiments of the present disclosure is implemented.

According to yet another aspect of the embodiments of the present disclosure, a computer-readable storage medium is provided. A computer program is stored thereon, and when the computer program is executed by a processor, the method according to any one of the foregoing embodiments of the present disclosure is implemented.

According to yet another aspect of the embodiments of the present disclosure, a computer program is provided, including computer instructions, wherein when the computer instructions are run in a processor of a device, the method according to any one of the foregoing embodiments of the present disclosure is implemented.

According to yet another aspect of the embodiments of the present disclosure, a computer program product is provided, which is configured to store computer-readable instructions, wherein when the instructions are executed, the computer implements the body key point detection method according to any one of the foregoing possible implementations.

In an optional implementation, the computer program product is a computer storage medium. In another optional implementation, the computer program product is a software product, such as a Software Development Kit (SDK).

Based on the lane line-based intelligent driving control method and apparatus, the electronic device, the program, and the medium provided by the foregoing embodiments of the present disclosure, a lane line detection result of a vehicle traveling environment is obtained, an estimated distance of traveling out of a lane line by the vehicle and/or estimated time of traveling out of the lane line by the vehicle are determined according to a traveling state of a vehicle and the lane line detection result, and intelligent driving control is performed on the vehicle according to the estimated distance and/or the estimated time. Therefore, the embodiments of the present disclosure implement lane line-based intelligent control on the vehicle traveling state, thereby helping to improve the driving safety.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION OF THE EMBODIMENTS

Figure 1:
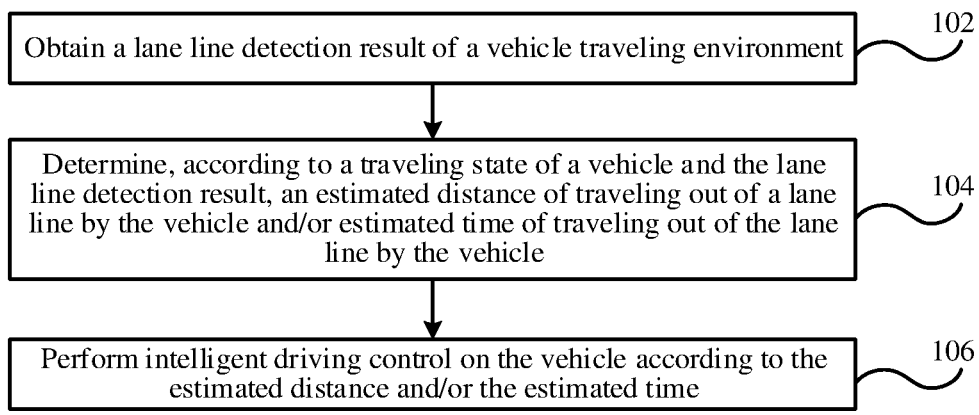
FIG. 1 is a flowchart of one embodiment of a lane line-based intelligent driving control method according to the present disclosure.

Various exemplary embodiments of the present disclosure are now described in detail with reference to the accompanying drawings. It should be noted that: unless otherwise stated specifically, relative arrangement of the components and steps, the numerical expressions, and the values set forth in the embodiments are not intended to limit the scope of the present disclosure.

It should be further understood that in the embodiments of the present disclosure, "a plurality of" may refer to two or more, and "at least one" may refer to one, two, or more.

Persons skilled in the art may understand that terms "first", "second", etc. in the embodiments of the present disclosure are only used for distinguishing different steps, devices, or modules, and do not represent any special technical meanings, and likewise do not represent necessary logic orders therebetween.

It should be further understood that any component, data, or structure mentioned in the embodiments of the present disclosure should be generally understood as one or more under the condition that no explicit definition is provided or no opposite motivation is provided in the context.

It should be further understood that the description of the embodiments of the present disclosure emphasizes the differences between the embodiments, and the same or similar points therebetween may be used as reference and are omitted for clarity.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to persons of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

In addition, the term "and/or" in the present disclosure only describes an association relation between associated objects, indicating that three relations may exist, for example, A and/or B may indicate three conditions, i.e., A exists separately, A and B exist at the same time, and B exists separately. In addition, the character "/" in the present disclosure generally represents the preceding and latter associated objects are in an "or" relation.

The embodiments of the present disclosure may be applied to electronic devices such as terminal devices, computer systems, servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems.

The electronic devices such as terminal devices, computer systems, and servers may be described in the general context of computer system executable instructions (for example, program modules) executed by the computer system. Generally, the program modules may include routines, programs, target programs, components, logics, data structures, and the like for performing specific tasks or implementing specific abstract data types. The computer systems/servers may be practiced in the distributed cloud computing environments in which tasks are executed by remote processing devices that are linked through a communication network. In the distributed computing environments, the program modules may be located in local or remote computing system storage media including storage devices.

FIG. 1 is a flowchart of one embodiment of a lane line-based intelligent driving control method according to the present disclosure. As shown in FIG. 1, the lane line-based intelligent driving control method of this embodiment includes:

102: A lane line detection result of a vehicle traveling environment is obtained.

In some optional examples, for example, the lane line detection result in the vehicle traveling environment may be obtained as follows: detecting a lane line in the vehicle traveling environment based on a neural network, for example, performing lane line detection on an image including the vehicle traveling environment through the neural network to obtain the lane line detection result; alternatively, directly obtaining the lane line detection result in the vehicle traveling environment from an advanced driver assistance system (ADAS), i.e., directly using the lane line detection result in the ADAS.

In an optional example, operation 102 may be executed by a processor by invoking a corresponding instruction stored in a memory, and may also be executed by an obtaining module run by the processor.

104: According to a traveling state of a vehicle and the lane line detection result, an estimated distance of traveling out of a lane line by the vehicle and/or estimated time of traveling out of the lane line by the vehicle are determined.

In an optional example, the operation 104 may be executed by a processor by invoking a corresponding instruction stored in a memory, and may also be executed by a determining module run by the processor.

106: Intelligent driving control is performed on the vehicle according to the estimated distance and/or the estimated time.

In some implementations, the performing intelligent driving control on the vehicle, for example, may include, but not limited to, performing at least one of the following controls on the vehicle: automatic driving control, assisted driving control, and the like.

The performing automatic driving control on the vehicle, for example, may include, but not limited to, performing at least one of the following controls on the vehicle: braking, deceleration, traveling direction changing, lane line keeping, driving mode switching control (for example, switching from an automatic driving mode to a non-automatic driving mode, and switching from the non-automatic driving mode to the automatic driving mode), and other operations of controlling a vehicle driving state. The driving mode switching control may control the vehicle to switch from the automatic driving mode to the non-automatic driving mode (such as, a manual driving mode) or from the non-automatic driving mode to the automatic driving mode.

The performing assisted driving control on the vehicle, for example, may include, but not limited to, performing any one or more of the following controls on the vehicle: performing lane line departure warning, performing lane line keeping prompt, and other operations of helping a driver to control the vehicle driving state.

In an optional example, operation 106 may be executed by the processor by invoking a corresponding instruction stored in the memory, and may also be executed by a control module run by the processor.

Based on the lane line-based intelligent driving control method provided by the foregoing embodiments of the present disclosure, a lane line detection result of a vehicle traveling environment is obtained, an estimated distance of traveling out of a lane line by the vehicle and/or estimated time of traveling out of the lane line by the vehicle are determined according to a traveling state of a vehicle and the lane line detection result, and intelligent driving control, such as automatic driving or assisted driving, is performed on the vehicle according to the estimated distance and/or the estimated time. Therefore, the embodiments of the present disclosure implement lane line-based intelligent control on the vehicle traveling state, in order to reduce or avoid the occurrence of traffic accidents when the vehicle drives out of the lane line, thereby helping to improve the driving safety.

Figure 2:
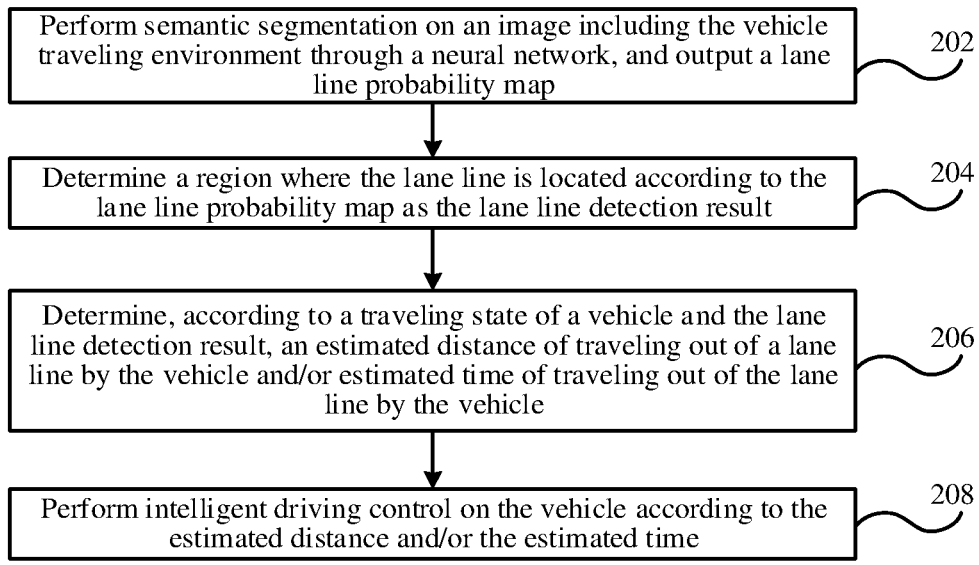
FIG. 2 is a flowchart of another embodiment of a lane line-based intelligent driving control method according to the present disclosure.

FIG. 2 is a flowchart of another embodiment of a lane line-based intelligent driving control method according to the present disclosure. As shown in FIG. 2, the lane line-based intelligent driving control method of this embodiment includes:

202: Semantic segmentation is performed on an image including a vehicle traveling environment through a neural network, and a lane line probability map is output.

The lane line probability map is used for representing a probability value that at least one pixel point in the image respectively belongs to the lane line.

The neural network in the embodiments of the present disclosure may be a deep neural network, such as a convolutional neural network, which may be trained in advance through a sample image and a pre-labeled and accurate lane line probability map. The training the neural network through the sample image and the accurate lane line probability map, for example, may be implemented as follows: performing semantic segmentation on the sample image through the neural network, and outputting a predicted lane line probability map; obtaining a loss function value of the neural network according to the difference between the predicted lane line probability map and the accurate lane line probability map at corresponding at least one pixel point, training the neural network based on the loss function value, for example, based on a gradient update training method, and adjusting the parameter value of each network layer parameter in the neural network through a chain rule back propagation gradient until preset conditions are satisfied, for example, the difference between the predicted lane line probability map and the accurate lane line probability map at the corresponding at least one pixel point is less than a predetermined difference value, and/or the number of trainings on the neural network reaches a predetermined number, to obtain a trained neural network.

In an optional example, operation 202 may be executed by a processor by invoking a corresponding instruction stored in a memory, and may also be executed by a detection unit run by the processor or a neural network in the detection unit.

204: A region where the lane line is located is determined according to the lane line probability map as the lane line detection result.

In an optional example, operation 204 may be executed by the processor by invoking a corresponding instruction stored in the memory, and may also be executed by the detection unit run by the processor or a determination subunit in the detection unit.

206: According to a traveling state of a vehicle and the lane line detection result, an estimated distance of traveling out of the lane line by the vehicle and/or estimated time of traveling out of the lane line by the vehicle are determined.

In an optional example, operation 206 may be executed by the processor by invoking a corresponding instruction stored in the memory, and may also be executed by a determination module run by the processor.

208: Intelligent driving control is performed on the vehicle according to the estimated distance and/or the estimated time.

In an optional example, operation 208 may be executed by the processor by invoking a corresponding instruction stored in the memory, and may also be executed by a control module run by the processor.

Based on the embodiments, semantic segmentation is performed on the image through the neural network, the lane line probability map is output, and the region where the lane line is located is determined according to the lane line probability map. Since the neural network may automatically learn various features of the lane line based on a deep learning approach by learning a large number of labeled lane line images, such as lane line images in scenes of bends, lane line missing, curbstone edges, dim light, backlighting, etc., there is no need to design the features manually, the process is simplified, and manual labeling costs are reduced. In addition, lane lines may be effective identified in various driving scenes, and lane line detection in various complex scenes such as bends, lane line missing, curbstone edges, dim light, and backlighting may be implemented, thereby improving the precision of the lane line detection, in order to obtain precise estimated distance and/or estimated time, thus helping to improve the accuracy of intelligent driving control, and improve the driving safety.

Optionally, in another embodiment of the lane line-based intelligent driving control method of the present disclosure, before operation 202, the method may further include: preprocessing an original image including the vehicle traveling environment to obtain the abovementioned image including the vehicle traveling environment. Accordingly, in operation 202, semantic segmentation is performed on the image obtained by the preprocessing through the neural network.

The preprocessing of the original image by the neural network may be, for example, zooming, cropping, etc. on the original image captured by a camera, the original image is zoomed and cropped into an image of a predetermined size, and the image is input into the neural network for processing, so as to reduce the complexity of performing semantic segmentation on the image by the neural network, reduce time consumption, and improve the processing efficiency.

In addition, the preprocessing of the original image by the neural network may also be selecting some quality-selectable images from the original image captured by the camera according to the predetermined image quality (for example, image sharpness, exposure, etc.), and inputting the images to the neural network for processing, thereby improving the accuracy of semantic segmentation in order to improve the accuracy of lane line detection.

In some implementations, the performing semantic segmentation on the image including the vehicle traveling environment through the neural network, and outputting the lane line probability map in operation 202 may include:

performing feature extraction on the image through the neural network to obtain a feature map; and performing semantic segmentation on the feature map through the neural network to obtain lane line probability maps of N lane lines. The pixel value of each pixel point in the lane line probability map of each lane is used for representing the probability value that the corresponding pixel point in the image respectively belongs to the lane line, and the value of N is an integer greater than 0. For example, in some optional examples, the value of N is 4.

The neural network in the embodiments of the present disclosure may include: a network layer for feature extraction and a network layer for classification. The network layer for feature extraction may include, for example, a convolution layer, a Batch Normalization (BN) layer, and a nonlinear layer. A feature map is generated by performing feature extraction on the image through the convolution layer, the BN layer and the nonlinear layer in sequence; the lane line probability maps of the multiple lane lines are obtained by performing semantic segmentation on the feature map through the network layer for classification.

The lane line probability maps of the N lane lines may be a probability map of one channel, and the pixel value of each pixel point in the probability map respectively represents a probability value that the corresponding pixel point in the image belongs to the lane line. The lane line probability maps of the N lane lines may also be probability maps of N+1 channels, and the N+1 channels correspond to N lane lines and a background respectively. That is, the probability maps of the channels in the probability maps of the N+1 channels respectively represent the probability that at least one pixel point in the abovementioned image respectively belongs to the lane line corresponding to the channel or the background.

In some optional examples, the performing semantic segmentation on the feature map through the neural network to obtain the lane line probability maps of N lane lines may include:

performing semantic segmentation on the feature map through the neural network to obtain the probability maps of the N+1 channels. The N+1 channels respectively corresponding to the N lane lines and the background, i.e., the probability map of each channel in the probability maps of the N+1 channels respectively represents the probability that at least one pixel point in the image respectively belongs to the lane line or the background.

The lane line probability maps of the N lane lines are obtained from the probability maps of the N+1 channels.

The neural network in the embodiments of the present disclosure may include: a network layer for feature extraction, a network layer for classification, and a normalized (Softmax) layer. A series of feature maps are generated by performing feature extraction on the image through each network layer for feature extraction in sequence; the lane line probability maps of the N+1 channels are obtained by performing semantic segmentation on the finally output feature map through the network layer for classification; and the lane line probability maps of the N+1 channels are normalized by using the Softmax layer, and the probability value of each pixel point in the lane line probability map is converted into a value in the range of 0 to 1.

In the embodiments of the present disclosure, the network layer for classification may perform multi-classification on the pixel points in the feature map, for example, for the scene having four lane lines (referred to as: the lane line at the left of the left lane line, the left lane line, the right lane line, and the lane line at the right of the right lane line), may perform five-classification on the pixel points in the feature map, identify the probability values of the pixel points in the feature map belonging to five categories (the background, the lane line at the left of the left lane line, the left lane line, the right lane line, and the lane line at the right of the right lane line), and respectively output the probability maps in which the pixel points in the feature map belong to one of the categories to obtain the probability maps of the N+1 channels. The probability value of each pixel point in each probability map represents the probability value that pixels in the image corresponding to the pixel belongs to a certain category.

In the foregoing embodiments, N is the number of the lane lines in the vehicle traveling environment, and may be any integer value greater than 0. For example, when the value of N is 2, the N+1 channels respectively correspond to the background, the left lane line, and the right lane line in the vehicle traveling environment; or when the value of N is 3, the N+1 channels respectively correspond to the background, the left lane line, the middle lane line, and the right lane line in the vehicle traveling environment; or when the value of N is 4, the N+1 channels respectively correspond to the background, the lane line at the left of the left lane line, the left lane line, the right lane line, and the lane line at the right of the right lane line in the vehicle traveling environment.

In some implementations, determining the region where the lane line is located according to the lane line probability map of one lane line in operation 204 may include:

selecting, from the lane line probability map, pixel points having a probability value greater than a first preset threshold;

performing maximum connected region search in the lane line probability map based on the selected pixel points to locate a set of pixel points belonging to the lane line; and determining the region where the lane line is located based on the set of pixel points belonging to the lane line.

Exemplarily, maximum connected region search is performed using a breadth-first search algorithm, all connected regions of which the probability values are greater than the first preset threshold are found, and then all the connected regions are compared to obtain the maximum region as the region where the detected lane line is located.

The output of the neural network is the lane line probability maps of the multiple lane lines. The pixel value of each pixel point in the lane line probability maps represents the probability value that the pixel point in the corresponding image belongs to a certain lane line, and the value may be a value between 0 and 1 after the normalization. The pixel points with a large probability of belonging to the lane line of the lane line probability map is selected from the lane line probability map through the first preset threshold, and then maximum connected region search is executed to locate a set of pixel points belonging to the lane line as the region where the lane line is located. The aforementioned operations are respectively executed for each lane line, i.e., the region where each lane line is located may be determined.

In some optional examples, the determining the region where the lane line is located based on the set of pixel points belonging to the lane line may include:

counting the sum of the probability values of all the pixel points in the set of pixel points belonging to the lane line to obtain a confidence score of the lane line; and if the confidence score is greater than a second preset threshold, using the region where the set of pixel points is formed as the region where the lane line is located.

In the embodiments of the present disclosure, for each lane line, the sum of the probability values of all the pixel points in the set of pixel points is counted to obtain the confidence score of the lane line. The confidence score is the probability value that the region formed by the set of pixel points is a real existing lane line. The second preset threshold is an empirical value set according to actual requirements, and may be adjusted according to the actual scene. If the confidence score is too small, i.e., not greater than the second preset threshold, it is indicated that the lane line does not exist, and the determined lane line is discarded; if the confidence score is larger, i.e., greater than the second preset threshold, it is indicated that the probability value that the determined lane line region is the real existing lane line is higher, and the region where the lane line is located is determined.

Figure 3:
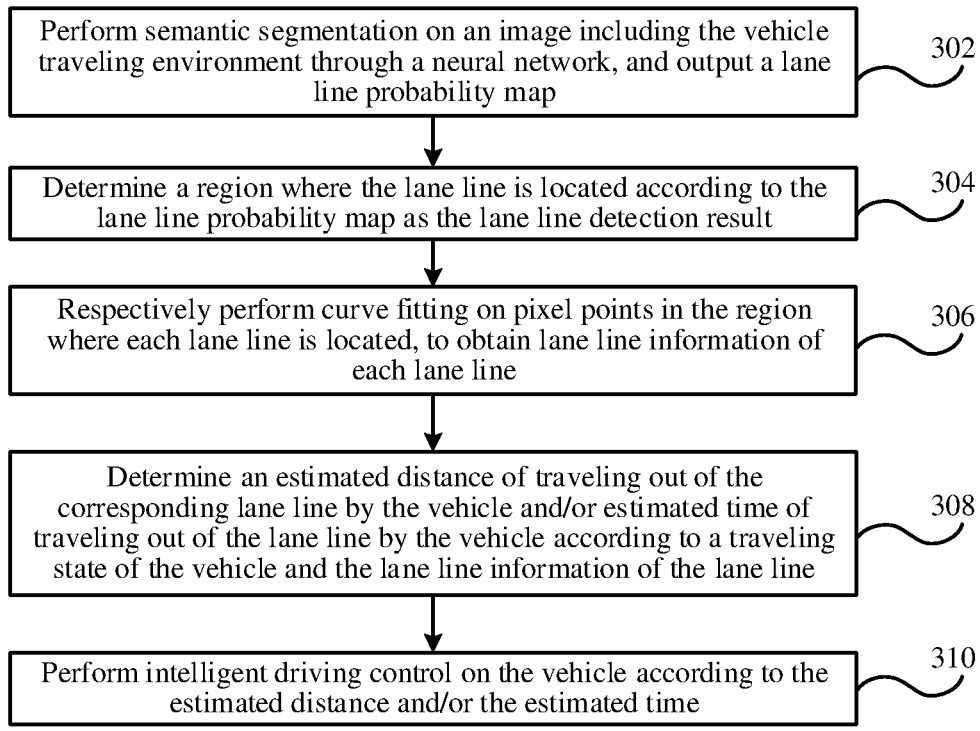
FIG. 3 is a flowchart of still another embodiment of a lane line-based intelligent driving control method according to the present disclosure.

FIG. 3 is a flowchart of another embodiment of a lane line-based intelligent driving control method according to the present disclosure. As shown in FIG. 3, the lane line-based intelligent driving control method of this embodiment includes:

302: Semantic segmentation is performed on an image including the vehicle traveling environment through the neural network, and a lane line probability map is output.

The lane line probability map is used for representing a probability value that at least one pixel point in the image respectively belongs to the lane line.

In an optional example, operation 302 may be executed by a processor by invoking a corresponding instruction stored in a memory, and may also be executed by a detection unit run by the processor or a neural network in the detection unit.

304: A region where the lane line is located is determined according to the lane line probability map as the lane line detection result.

In an optional example, operation 304 may be executed by the processor by invoking a corresponding instruction stored in the memory, and may also be executed by the detection unit run by the processor or a determination subunit in the detection unit.

306: Curve fitting is respectively performed on the pixel points in the region where each of the lane lines is located, to obtain lane line information of each of the lane lines.

The lane line information includes a distance from at least one point on the lane line (for example, each point on the lane line) to the vehicle. The lane line information may be expressed in multiple forms, for example, may be a curve, a straight line, a discrete map including at least one point on the lane line and its distance from the vehicle, and may also be a data table, or may also be expressed as one equation, or the like. The embodiments of the present disclosure do not limit the expression forms of the lane line information.

Figure 4:
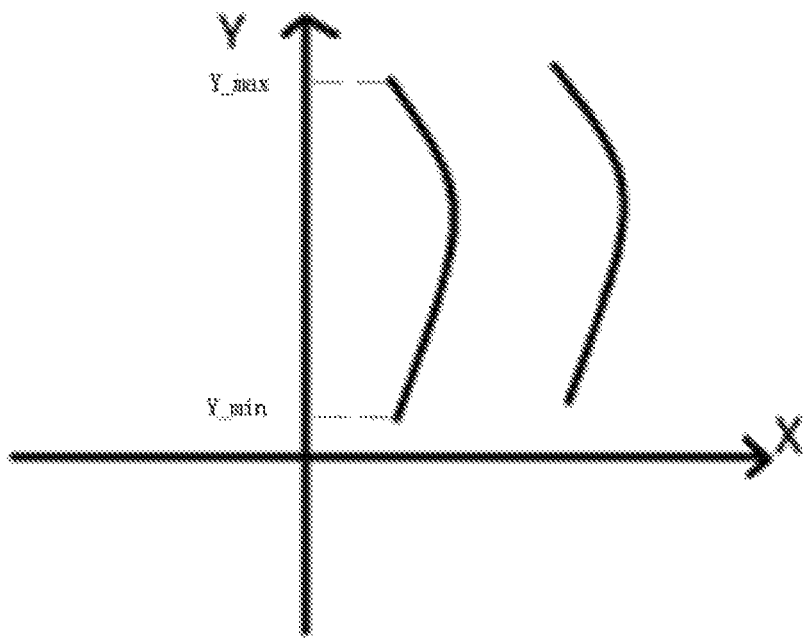
FIG. 4 shows an example of two lane lines in the embodiments of the present disclosure.

When the lane line information is expressed as an equation, it may be called a lane line equation. In some optional examples, the lane line equation may be a quadratic curve equation, and may be expressed as: $x=a*y*y+b*y+c$. There are three parameters (a, b, c) in the lane line equation. As shown in FIG. 4, two of the curves are two lane lines corresponding to two lane line equations. Y_max represents the maximum distance from one point on the ground where the lane line is located to a straight-ahead vertical direction of the vehicle, and Y_min represents the minimum distance from one point on the ground where the lane line is located to the straight-ahead vertical direction of the vehicle.

In an optional example, operation 306 may be executed by the processor by invoking a corresponding instruction stored in the memory, and may also be executed by a determination module run by the processor or a fitting processing unit in the determination module.

308: The estimated distance of traveling out of the corresponding lane line by the vehicle and/or the estimated time of traveling out of the lane line by the vehicle are determined according to the traveling state of the vehicle and the lane line information of the lane line.

In an optional example, operation 308 may be executed by the processor by invoking a corresponding instruction stored in the memory, and may also be executed by the determination module run by the processor or a determination unit in the determination module.

310: Intelligent driving control is performed on the vehicle according to the estimated distance and/or the estimated time.

In an optional example, operation 310 may be executed by the processor by invoking a corresponding instruction stored in the memory, and may also be executed by a control module run by the processor.

In the embodiments of the present disclosure, after determining the region where the lane line is located, the lane line information of each lane line is obtained by performing curve fitting on the pixel points in the region where each lane line is located, and the estimated distance of traveling out of the corresponding lane line by the vehicle and/or the estimated time of traveling out of the lane line by the vehicle are determined according to the traveling state of the vehicle and the lane line information of the lane line. Since the lane line information obtained by performing curve fitting may be expressed as a quadratic curve or in similar ways, it can fit the bend lane line better and has good applicability to the bend. It may be applied to the warning of various road conditions.

In some implementations, performing curve fitting on the pixel points in the region where the lane line is located to obtain the lane line information of the lane line in operation 306 may include:

selecting multiple (for example, three or more) pixel points from the region where one of the lane lines is located;

converting the multiple pixel points from a camera coordinate system where the camera is located into a world coordinate system, to obtain coordinates of the multiple pixel points in the world coordinate system. The origin of the world coordinate system may be set according to requirements. For example, the origin may be set as the landing point of the left front wheel of the vehicle, and the y-axis direction of the world coordinate system is the straight-ahead direction of the vehicle.

Curve fitting is performed on the multiple pixel points in the world coordinate system according to the coordinates of the multiple pixel points in the world coordinate system, to obtain the lane line information of the lane line.

For example, some of the pixel points may be randomly selected from the region where one lane line is located, these pixel points are converted into the world coordinate system according to camera calibration parameters (may also be referred to as camera calibration parameters), and then a fitted curve may be obtained just by performing curve fitting on these pixel points under the world coordinate system. The distance from any point on the lane line to the vehicle may be calculated according to the fitted curve, i.e., the distance y from any point x on the ground where the lane line is located to the straight-ahead vertical direction of the vehicle and the lane division situations on the road ahead may be calculated according to the fitting curve $x=a*y*y+b*y+c$, wherein a, b, and c are parameters in the fitted curve. The camera calibration parameters may include internal parameters and external parameters. The position and orientation of a camera or a video camera in the world coordinate system may be determined based on the external parameters. The external parameters may include a rotation matrix and a translation matrix. The rotation matrix and the translation matrix together describe how to convert the points from the world coordinate system to the camera coordinate system or vice versa; the internal parameters are parameters related to the characteristics of the camera itself, such as the focal length, the pixel size, and the like of the camera.

The curve fitting refers to the calculation of the curves formed by these points through some discrete points. In some optional examples in the embodiments of the present disclosure, curve fitting may be performed based on the multiple pixel points, for example, by using a least squares method.

In addition, in another embodiment of the lane line-based intelligent driving control method according to the present disclosure, in order to prevent lane line jitter determined based on two frame images and a chaotic situation of lane lines during vehicle lane change, after the lane line information of the lane line is obtained through operation 306, the method further includes: filtering parameters in the lane line information of the lane line to filter out jitter and some abnormal situations, thereby ensuring the stability of the lane line information. Accordingly, in operation 308, the estimated distance of traveling out of the corresponding lane line by the vehicle and/or the estimated time of traveling out of the lane line by the vehicle are determined according to the traveling state of the vehicle and the lane line information of the lane line determined by the filtering. In some implementations, the filtering the parameters in the lane line information of one lane line may include:

According to the parameter values of the parameters in the lane line information of the lane line and the parameter values of the parameters in historical lane line information of the lane line obtained based on the previous frame image, Kalman filtering is performed on the parameter values of the parameters in the lane line information. The previous frame image is a frame image with detection timing prior to that of the image in the video where the image is located, for example, may be the previous frame image adjacent to the image, and may also be an image with detection timing prior to that of the image and spaced by one or more frames.

Kalman filtering is an estimation method of making, according to the statistical characteristics of a time-varying random signal, the future value of the signal as close as possible to the true value. In the embodiments, by performing, according to the parameter values of the parameters in the lane line information and the parameter values of the parameters in the historical lane line information of the lane line obtained based on the previous frame image, Kalman filtering on the parameter values of the parameters in the lane line information, the accuracy of the lane line information may be improved, thereby helping to subsequently and precisely determine information such as the distance between the vehicle and the lane line, in order to perform accurate warning for the departure of the vehicle from the lane line.

Further, in yet another embodiment of the lane line-based intelligent driving control method according to the present disclosure, before performing Kalman filtering on the parameter values of the parameters in the lane line information, the method may further include: for the same lane line, selecting the lane line information in which the parameter values of the parameters in the lane line information change with respect to the parameter values of corresponding parameters in the historical lane line information and the differences between the parameter values of the parameters in the lane line information and the parameter values of the corresponding parameters in the historical lane line information are less than a third preset threshold, to serve as effective lane line information for Kalman filtering, i.e., smoothing the parameters in the lane line information (such as, three parameters (a, b, c) in $x=a*y*y+b*y+c$).Since the parameters in the lane line information obtained by fitting based on each frame image in the video will all change, but the adjacent frame images will not change too much, the lane line information of the current frame image may be smoothed to filter out jitter and some abnormal situations to ensure the stability of the lane line information.

For example, in some implementations, among the lane lines determined for the first frame image participating in lane line detection in the video, a tracker may be established for each lane line respectively to track the lane line. If the current frame image detects the same lane line, and the differences between the parameter values in the lane line information of the lane line and in the lane line information of the same lane line determined by the previous frame image are less than the third preset threshold, the parameter values in the lane line information of the current frame image are updated to the tracker of the same lane line determined by the previous frame image to perform Kalman filtering on the lane line information of the same lane line in the current frame image. If the tracker of the same lane line is updated in both of two consecutive frame images, it is indicated that the determination result of the lane line is more accurate, the tracker of the lane line may be confirmed, and the lane line tracked by the tracker is set as the final lane line result.

If the tracker has not been updated for several consecutive frames, it is considered that the corresponding lane line disappears and the tracker is deleted.

If the lane line matching the previous frame image is not detected from the current frame image, it is indicated that the lane line error determined in the previous frame image is large, and the tracker in the previous frame image is deleted.

In some implementations of any embodiment, the determining, according to the traveling state of the vehicle and the lane line detection result, the estimated distance of traveling out of the lane line by the vehicle in operation 308 may include:

determining an estimated distance between the vehicle and the corresponding lane line based on the position of the vehicle in the world coordinate system and the lane line information of the lane line. In this embodiment, the traveling state of the vehicle includes the position of the vehicle in the world coordinate system.

Similarly, the determining, according to the traveling state of the vehicle and the lane line detection result, the estimated time of traveling out of the lane line by the vehicle in operation 308 may include:

determining the estimated time of traveling out of the lane line by the vehicle according to the speed of the vehicle, the position of the vehicle in the world coordinate system, and the lane line information of the lane line. The traveling state of the vehicle includes the speed of the vehicle and the position of the vehicle in the world coordinate system.

In some implementations of any embodiment, the performing intelligent driving control on the vehicle according to the estimated distance and/or the estimated time may include:

comparing the estimated distance and/or the estimated time with at least one predetermined threshold; and performing, when the comparison result satisfies one or more preset conditions, intelligent driving control corresponding to the satisfied preset conditions, automatic driving control and/or assisted driving control corresponding to the satisfied preset conditions.

When there are multiple preset conditions, the degrees of the intelligent driving control corresponding to the multiple preset conditions may be gradually increased. In the embodiments, the degree of intelligent driving control corresponding to the multiple preset conditions may be gradually increased, a corresponding intelligent driving control measure may be adopted to perform corresponding automatic driving control and/or assisted driving control on the vehicle according to the differences in the estimated distance and/or estimated time of traveling out of the lane line by the vehicle, and it is possible to effectively prevent the occurrence of traffic accidents when the vehicle travels out of the lane line without interfering with normal driving, thereby improve the driving safety.

For example, in some optional examples, the performing, when the comparison result satisfies one or more preset conditions, the intelligent driving control corresponding to the satisfied preset conditions may include:

performing lane line departure prompt on the vehicle if the estimated distance is less than or equal to a fourth preset threshold and is greater than a fifth preset threshold, for example, prompting that the vehicle has departed from the current lane, will drive out of the current lane, etc.; or performing lane line departure prompt on the vehicle if the estimated time is less than or equal to a sixth preset threshold and is greater than a seventh preset threshold; or performing lane line departure prompt on the vehicle if the estimated distance is less than or equal to the fourth preset threshold and is greater than the fifth preset threshold, and the estimated time is less than or equal to the sixth preset threshold and is greater than the seventh preset threshold;

The lane line departure warning includes the lane line departure prompt. The values of the fourth preset threshold and the fifth preset threshold are respectively greater than 0, and the fifth preset threshold is smaller than the fourth preset threshold. For example, the values of the fourth preset threshold and the fifth preset threshold are respectively 5 meters and 3 meters. The values of the sixth preset threshold and the seventh preset threshold are respectively greater than 0, and the seventh preset threshold is smaller than the sixth preset threshold. For example, the values of the sixth preset threshold and the seventh preset threshold are respectively 5 seconds and 3 seconds.

When the estimated distance from the vehicle to the lane line is less than or equal to the fourth preset threshold and greater than the fifth preset threshold, or the estimated time predicted for the vehicle to travel out of the lane line is less than or equal to the sixth preset threshold and greater than the seventh threshold, performing lane line departure prompt on the vehicle, may prompt the driver to notice that the vehicle has departed from the lane line so as to take corresponding driving measures in time to prevent the vehicle from traveling out of the lane line, thereby improving the driving safety. Performing lane line departure prompt based on the combination of the estimated distance from the vehicle to the lane line and the estimated time of traveling out of the lane line improves the accuracy of the lane line departure warning. In a further optional example, the method may further include:

performing automatic driving control and/or lane line departure alerting on the vehicle if the estimated distance is less than or equal to the fifth preset threshold; or performing automatic driving control and/or lane line departure alerting on the vehicle if the estimated time is less than or equal to the seventh preset threshold; or performing automatic driving control and/or lane line departure alerting on the vehicle if the estimated distance is less than or equal to the fifth preset threshold and the estimated time is less than or equal to the seventh preset threshold;

wherein the lane line departure warning comprises the lane line departure alerting, and the lane line departure alerting may be, for example, alerting by sound, light, electricity, or the like.

In the foregoing embodiment, as the estimated distance and/or the estimated time decreases gradually, the degree of corresponding intelligent driving control is gradually increased, from performing lane departure warning on the vehicle to performing automatic driving control and/or lane line departure alerting on the vehicle, to prevent the vehicle from traveling out of the lane line, thereby improve the driving safety.

In a further optional example, automatic driving control and/or lane line departure alerting may be performed on the vehicle when the estimated distances determined based on the image and the historical frame image are both less than or equal to the fifth preset threshold, wherein the historical frame image includes at least one frame image with detection timing prior to that of the image in the video where the image is located; or, when the estimated times determined based on the image and the historical frame image are both less than or equal to the seventh preset threshold, automatic driving control and/or lane line departure alerting are performed on the vehicle; or, when the estimated distances determined based on the image and the historical frame image are both less than or equal to the fifth preset threshold, and the estimated times determined based on the image and the historical frame image are both less than or equal to the seventh preset threshold, automatic driving control and/or lane line departure alerting are performed on the vehicle.

In the embodiments, the estimated distance and/or the estimated time of the historical frame image are also counted as the basis for performing automatic driving control and/or lane line departure alerting on the vehicle, and thus the accuracy of performing automatic driving control and/or lane line departure alerting on the vehicle may be improved.

For example, in an application example, assuming that the current position of the vehicle is A, the intersection position along the current traveling direction and one lane line (assumed to be referred to as a target lane line) is B, then the line segment AB is the trajectory of the vehicle of traveling out of the target lane line in the current state. According to the camera calibration parameters, the absolute position A' of the vehicle in the world coordinate system may be obtained, and then according to the lane line equation of the target lane line, the intersection position B between the straight line A'B in the lane line traveling direction and the target lane line may be calculated, thereby obtaining the length of the straight line A'B. The time t at which the vehicle travels out of the target lane line may be calculated based on the current traveling speed of the vehicle. Statistics are collected about the historical frame image information. If the times at which the vehicle is about to travel out of the target lane line in several frame images are all too short (less than the seventh preset threshold), and the distance A'B from the vehicle to the target lane line is too short (less than the fifth preset threshold), then automatic driving control and/or lane line departure alerting are performed, for example, the vehicle is decelerated, and meanwhile an audible alert is issued. In addition, by collecting statistics about the historical frame image information, the lateral speed of the vehicle at the current time may be calculated, and then according to the current distance from the vehicle to the target lane line, the time when the vehicle will press the target lane line from the current time (i.e., the time of reaching the target lane line) may be calculated as the basis for whether to perform automatic driving control and/or lane line departure alerting on the vehicle.

The distance between the vehicle and the target lane line may be obtained according to the setting of the origin of the lane line equation coordinates of the target lane line, as well as the vehicle traveling direction and the vehicle width. For example, if the origin of the lane line equation coordinates is set as the left wheel of the vehicle and the target lane line is at the left side of the vehicle, the distance between the vehicle and the intersection between the traveling direction of the vehicle and the target lane line may be directly obtained. If the origin of the lane line equation coordinates is set as the right wheel of the vehicle, and the target lane line is at the left side of the vehicle, then the distance between the vehicle and the intersection between the traveling direction thereof and the target lane line, as well as the effective width of the vehicle width projected in the traveling direction thereof, i.e., the distance between the vehicle and the target lane line, are obtained. If the origin of the lane line equation coordinates is set as the center of the vehicle, and the target lane line is at the left side of the vehicle, then the distance between the vehicle and the intersection between the traveling direction thereof and the target lane line, as well as the effective width of the half width of the vehicle projected in the traveling direction thereof, i.e., the estimated distance between the vehicle and the target lane line, are obtained.

The embodiments of the present disclosure may be applied to automatic driving and assisted driving scenes to implement precise lane line detection, automatic driving control, and vehicle departure lane line warning.

Any lane line-based intelligent driving control method provided by the embodiments of the present disclosure may be executed by any appropriate device having a data processing capability, including, but not limited to, a terminal device and a server. Alternatively, any lane line-based intelligent driving control method provided by the embodiments of the present disclosure may executed by a processor, for example, any lane line-based intelligent driving control method mentioned in the embodiments of the present disclosure is executed by the processor by invoking corresponding instructions stored in a memory. Details are not described below again.

Persons of ordinary skill in the art may understand that: all or some steps for implementing the foregoing method embodiments are achieved by related hardware instructed by a program; the foregoing program may be stored in a computer readable storage medium; and when the program is executed, the steps including the foregoing method embodiments are executed. Moreover, the foregoing storage medium includes various media capable of storing program codes, such as a ROM, a RAM, a magnetic disk, or an optical disk.

Figure 5:
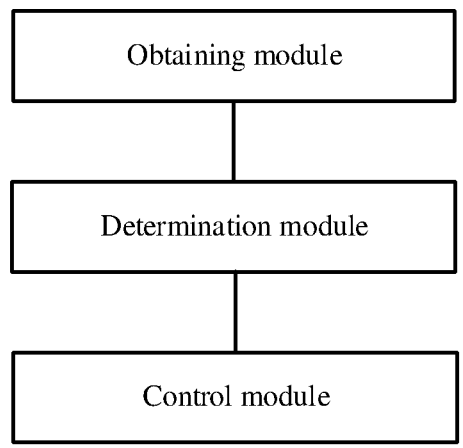
FIG. 5 is a schematic structural diagram of one embodiment of a lane line-based intelligent driving control apparatus according to the present disclosure.

FIG. 5 is a schematic structural diagram of one embodiment of a lane line-based intelligent driving control apparatus according to the present disclosure. The lane line-based intelligent driving control apparatus of this embodiment may be configured to implement any one of the lane line-based control method embodiments of the present disclosure. As shown in FIG. 5, the lane line-based intelligent driving control apparatus of this embodiment includes: an obtaining module, a determination module, and a control module; wherein the obtaining module is configured to obtain a lane line detection result of a vehicle traveling environment.

The determination module is configured to determine, according to a traveling state of a vehicle and the lane line detection result, an estimated distance of traveling out of a lane line by the vehicle and/or estimated time of traveling out of the lane line by the vehicle.

The control module is configured to perform intelligent driving control on the vehicle according to the estimated distance and/or the estimated time.

Based on the lane line-based intelligent driving control apparatus provided by the foregoing embodiments of the present disclosure, a lane line detection result of a vehicle traveling environment is obtained, an estimated distance of traveling out of a lane line by the vehicle and/or estimated time of traveling out of the lane line by the vehicle are determined according to a traveling state of a vehicle and the lane line detection result, and intelligent driving control is performed on the vehicle according to the estimated distance and/or the estimated time. Therefore, the embodiments of the present disclosure implement lane line-based intelligent control on the vehicle traveling state, in order to keep the vehicle to travel within the lane line to reduce or avoid the occurrence of traffic accidents when the vehicle drives out of the lane line, thereby improving the driving safety.

In some implementations, the obtaining module may include: a detection unit, configured to detect the lane line in the vehicle traveling environment based on a neural network to obtain the lane line detection result; or an obtaining unit, configured to obtain the lane line detection result of the vehicle traveling environment from an advanced driver assistance system.

In some implementations, the detection unit may include: the neural network, configured to perform semantic segmentation on an image including the vehicle traveling environment, and output a lane line probability map, the lane line probability map being used for representing a probability value that at least one pixel point in the image respectively belongs to the lane line; and a determination subunit, configured to determine a region where the lane line is located according to the lane line probability map, the lane line detection result including the region where the lane line is located.

In some implementations, the neural network is configured to: perform feature extraction on the image through the neural network to obtain a feature map; and perform semantic segmentation on the feature map through the neural network to obtain lane line probability maps of N lane lines, the pixel value of each pixel point in the lane line probability map of each lane representing the probability value that the corresponding pixel point in the image respectively belongs to the lane line, and the value of N being an integer greater than 0.

The neural network is configured, when performing semantic segmentation on the feature map to obtain the lane line probability maps of the N lane lines, to: perform semantic segmentation on the feature map through the neural network to obtain probability maps of N+1 channels, the N+1 channels respectively corresponding to the N lane lines and a background; and obtain the lane line probability maps of the N lane lines from the probability maps of the N+1 channels.

In some implementations, if the value of N is 2, the N+1 channels correspond to the background, the left lane line, and the right lane line, respectively; or if the value of N is 3, the N+1 channels correspond to the background, the left lane line, the middle lane line, and the right lane line, respectively; or if the value of N is 4, the N+1 channels correspond to the background, the lane line at the left of the left lane line, the left lane line, the right lane line, and the lane line at the right of the right lane line, respectively.

In some implementations, the determination subunit is configured to: select, from the lane line probability map of the lane line, pixel points having a probability value greater than a first preset threshold; perform maximum connected region search in the lane line probability map based on the selected pixel points to locate a set of pixel points belonging to the lane line; and determine the region where the lane line is located based on the set of pixel points belonging to the lane line.

For example, the determination subunit is configured, when determining the region where the lane line is located based on the set of pixel points belonging to the lane line, to: count the sum of the probability values of all the pixel points in the set of pixel points belonging to the lane line to obtain a confidence score of the lane line; and if the confidence score is greater than a second preset threshold, use the region where the set of pixel points is formed as the region where the lane line is located.

Figure 6:
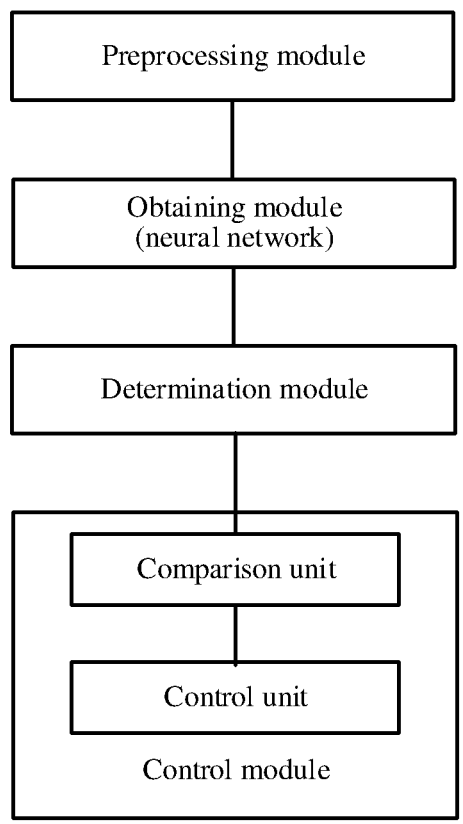
FIG. 6 is a schematic structural diagram of another embodiment of a lane line-based intelligent driving control apparatus according to the present disclosure.

FIG. 6 is a schematic structural diagram of one embodiment of a lane line-based intelligent driving control apparatus according to the present disclosure. As shown in FIG. 6, compared with the embodiment shown in FIG. 5, the lane line-based intelligent driving control apparatus of this embodiment further includes: a preprocessing module, configured to preprocess an original image including the vehicle traveling environment. Accordingly, in this embodiment, the neural network is configured, when performing semantic segmentation on the image including the vehicle traveling environment, to: perform semantic segmentation on the image obtained by the preprocessing.

In some implementations, the determination module may include: a fitting processing unit, configured to respectively perform curve fitting on the pixel points in the region where each of the lane lines is located, to obtain lane line information of each of the lane lines, the lane line information including a distance from at least one point on the lane line to the vehicle; and a determination unit, configured to determine the estimated distance of traveling out of the lane line by the vehicle and/or the estimated time of traveling out of the lane line by the vehicle according to the traveling state of the vehicle and the lane line information of the lane line.

In some optional examples, the fitting processing unit is configured to: select multiple pixel points from the region where one of the lane lines is located; convert the multiple pixel points from a camera coordinate system where the camera is located into a world coordinate system, to obtain coordinates of the multiple pixel points in the world coordinate system; and perform curve fitting on the multiple pixel points in the world coordinate system according to the coordinates of the multiple pixel points in the world coordinate system, to obtain lane line information of the lane line.

In addition, in some other implementations, the determination module may further include: a filtering unit, configured to filter parameters in the lane line information of the lane line. Accordingly, in this embodiment, the determination unit is configured to: determine the estimated distance of traveling out of the lane line by the vehicle and/or the estimated time of traveling out of the lane line by the vehicle according to the traveling state of the vehicle and the lane line information of the lane line obtained by the filtering.

In some optional examples, the filtering unit is configured to perform, according to parameter values of the parameters in the lane line information and parameter values of parameters in historical lane line information of the lane line obtained based on the previous frame image, Kalman filtering on the parameter values of the parameters in the lane line information. The previous frame image is a frame image with detection timing prior to that of the image in the video where the image is located.

Accordingly, in some other optional examples, the determination module may further include: a selection unit, configured to select the lane line information in which the parameter values of the parameters in the lane line information change with respect to the parameter values of corresponding parameters in the historical lane line information and the differences between the parameter values of the parameters in the lane line information and the parameter values of the corresponding parameters in the historical lane line information are less than a third preset threshold, to serve as effective lane line information for Kalman filtering.

In some other implementations, the determination module is configured, when determining, according to the traveling state of the vehicle and the lane line detection result, the estimated distance of traveling out of the lane line by the vehicle, to determine an estimated distance between the vehicle and the lane line based on the position of the vehicle in the world coordinate system and the lane line information of the lane line. The traveling state of the vehicle includes the position of the vehicle in the world coordinate system.

In some other optional implementations, the determination module is configured, when determining, according to the traveling state of the vehicle and the lane line detection result, the estimated time of traveling out of the lane line by the vehicle, to determine the estimated time of traveling out of the lane line by the vehicle according to the speed of the vehicle, the position of the vehicle in the world coordinate system, and the lane line information of the lane line. The traveling state of the vehicle includes the speed of the vehicle and the position of the vehicle in the world coordinate system.

Referring to FIG. 6 again, in some implementations, the control module may include: a comparison unit, configured to compare the estimated distance and/or the estimated time with at least one predetermined threshold; and a control unit, configured to perform, when the comparison result satisfies one or more preset conditions, intelligent driving control corresponding to the satisfied preset conditions. The intelligent driving control includes: automatic driving control and/or assisted driving control.

In some implementations, the performing intelligent driving control on the vehicle, for example, may include, but not limited to, performing at least one of the following controls on the vehicle: automatic driving control, assisted driving control, and the like. The performing automatic driving control on the vehicle, for example, may include, but not limited to, performing at least one of the following controls on the vehicle: braking, deceleration, traveling direction changing, lane line keeping, driving mode switching control, and other operations of controlling a vehicle driving state. The performing assisted driving control on the vehicle, for example, may include, but not limited to, performing any one or more of the following controls on the vehicle: performing lane line departure warning, performing lane line keeping prompt, and other operations of helping a driver to control the vehicle driving state.

Optionally, in the foregoing embodiments, when there are multiple preset conditions, the degrees of the intelligent driving control corresponding to the multiple preset conditions may be gradually increased.

In some implementations, the control unit is configured to: perform lane line departure prompt on the vehicle if the estimated distance is less than or equal to a fourth preset threshold and is greater than a fifth preset threshold; or perform lane line departure prompt on the vehicle if the estimated time is less than or equal to a sixth preset threshold and is greater than a seventh preset threshold; or perform lane line departure prompt on the vehicle if the estimated distance is less than or equal to the fourth preset threshold and is greater than the fifth preset threshold, and the estimated time is less than or equal to the sixth preset threshold and is greater than the seventh preset threshold. The lane line departure warning includes the lane line departure prompt; the fifth preset threshold is less than the fourth preset threshold, and the seventh preset threshold is less than the sixth preset threshold.

In some implementations, the control unit is further configured to: perform automatic driving control and/or lane line departure alerting on the vehicle if the estimated distance is less than or equal to the fifth preset threshold; or perform automatic driving control and/or lane line departure alerting on the vehicle if the estimated time is less than or equal to the seventh preset threshold; or perform automatic driving control and/or lane line departure alerting on the vehicle if the estimated distance is less than or equal to the fifth preset threshold and the estimated time is less than or equal to the seventh preset threshold. The lane line departure warning includes the lane line departure alerting.

In some further implementations, the control unit is configured: when performing automatic driving control and/or lane line departure alerting on the vehicle if the estimated distance is less than or equal to the fifth preset threshold, to: perform automatic driving control and/or lane line departure alerting on the vehicle if the estimated distances determined based on the image and a historical frame image are both less than or equal to the fifth preset threshold, the historical frame image including at least one frame image with detection timing prior to that of the image in the video where the image is located; or when performing automatic driving control and/or lane line departure alerting on the vehicle if the estimated time is less than or equal to the seventh preset threshold, to: perform automatic driving control and/or lane line departure alerting on the vehicle if the estimated times determined based on the image and the historical frame image are both less than or equal to the seventh preset threshold; or when performing automatic driving control and/or lane line departure alerting on the vehicle if the estimated distance is less than or equal to the fifth preset threshold and the estimated time is less than or equal to the seventh preset threshold, to: perform automatic driving control and/or lane line departure alerting on the vehicle if the estimated distances determined based on the image and the historical frame image are both less than or equal to the fifth preset threshold, and the estimated times determined based on the image and the historical frame image are both less than or equal to the seventh preset threshold.

The embodiments of the present disclosure further provide an electronic device, including the lane line-based intelligent driving control apparatus according to any of the foregoing embodiments of the present disclosure.

The embodiments of the present application further provide another electronic device, including: a memory, configured to store executable instructions; and a processor, configured to communicate with the memory to execute the executable instructions so as to complete operations of the lane line-based intelligent driving control method according to any one of the foregoing embodiments of the present disclosure.

Figure 7:
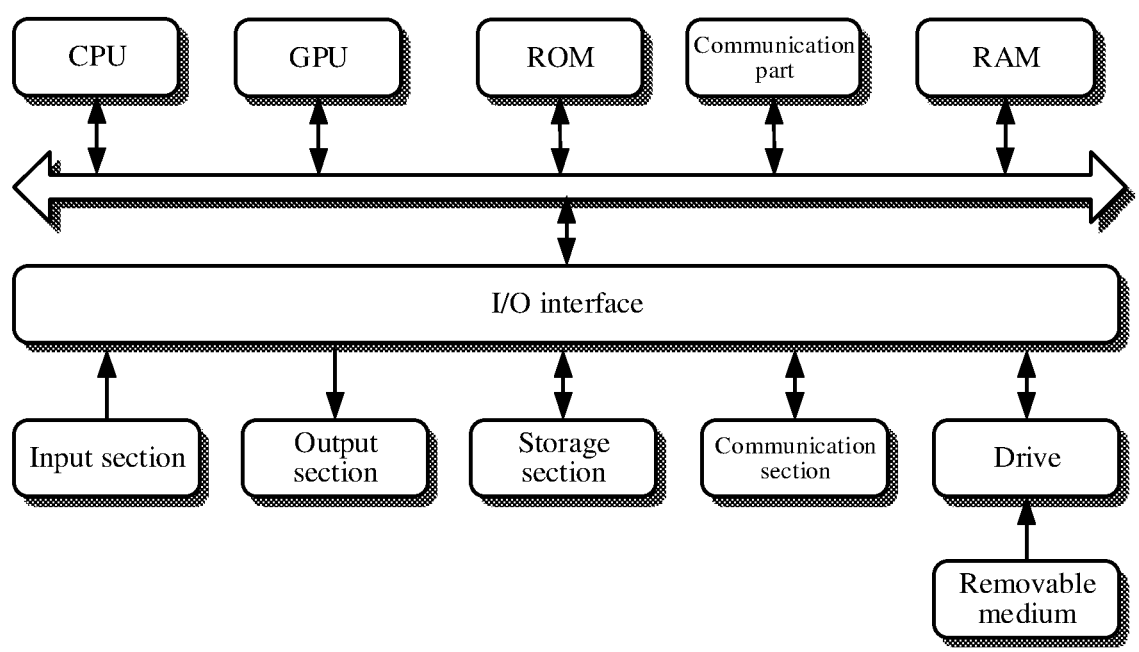
FIG. 7 is a schematic structural diagram of an application embodiment of an electronic device according to the present disclosure.

FIG. 7 is a schematic structural diagram of an application embodiment of an electronic device according to the present disclosure. Referring to FIG. 7 below, a schematic structural diagram of an electronic device, which may be a terminal device or a server, suitable for implementing the embodiments of the present disclosure is shown. As shown in FIG. 7, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The communication part may include, but is not limited to, a network card. The network card may include, but is not limited to, an Infiniband (IB) network card. The processor may communicate with the ROM and/or the RAM, to execute executable instructions. The processor is connected to the communication part via a bus, and communicates with other target devices via the communication part, so as to complement corresponding operations of any lane line-based intelligent driving control method provided by the embodiments of the present disclosure, for example, obtaining a lane line detection result of a vehicle traveling environment; determining, according to a traveling state of a vehicle and the lane line detection result, an estimated distance of traveling out of a lane line by the vehicle and/or estimated time of traveling out of the lane line by the vehicle; and performing intelligent driving control on the vehicle according to the estimated distance and/or the estimated time.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to execute corresponding operations of any lane line-based intelligent driving control method of the present disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication section performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture illustrated in FIG. 7 is merely an optional implementation mode. During specific practice, the number and types of the components in FIG. 7 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of the present disclosure.

In addition, the embodiments of the present disclosure further provide a computer storage medium, configured to store computer-readable instructions. When the instructions are executed, the operations of the lane line-based intelligent driving control method according to any one of the foregoing embodiments of the present disclosure are implemented.

In addition, the embodiments of the present disclosure further provide a computer program, including computer-readable instructions. When the computer-readable instructions run in a device, a processor in the device execute executable instructions for implementing the steps in the lane line-based intelligent driving control method according to any one of the foregoing embodiments of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses of the present disclosure are implemented in many manners. For example, the methods and apparatuses of the present disclosure are implemented with software, hardware, firmware, or any combination of software, hardware, and firmware. Unless otherwise specially stated, the foregoing sequences of steps of the methods are merely for description, and are not intended to limit the steps of the methods of this disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to persons of ordinary skill in the art. The embodiments are selected and described to better describe a principle and an actual application of the present disclosure, and to make persons of ordinary skill in the art understand the present disclosure, so as to design various embodiments with various modifications applicable to particular use.

The invention claimed is:

1. A lane line-based intelligent driving control method, comprising:
obtaining a lane line detection result of a vehicle traveling environment by detecting the lane line in the vehicle traveling environment based on a neural network;
determining, according to a traveling state of the vehicle and the lane line detection result, an estimated distance by which the vehicle travels out of a lane line and/or estimated time during which the vehicle travels out of the lane line; and
performing intelligent driving control on the vehicle according to the estimated distance and/or the estimated time,
wherein the obtaining a lane line detection result of a vehicle traveling environment by detecting the lane line in the vehicle traveling environment based on a neural network comprises:
performing semantic segmentation on an image comprising the vehicle traveling environment through the neural network to output a lane line probability map, the lane line probability map being used for representing a probability value that each of one or more pixel points in the image belongs to the lane line; and
determining a region where the lane line is located according to the lane line probability map, the region being included in the lane line detection result,
wherein the performing semantic segmentation on an image comprising the vehicle traveling environment through the neural network to output a lane line probability map comprises:
performing feature extraction on the image through the neural network to obtain a feature map; and
performing the semantic segmentation on the feature map through the neural network to obtain lane line probability maps of N lane lines, a pixel value of each pixel point in the lane line probability map of each lane line representing the probability value that the corresponding pixel point in the image belongs to the lane line, and a value of N being an integer greater than zero, and
wherein the performing intelligent driving control on the vehicle according to the estimated distance and/or the estimated time comprises:
performing lane line departure prompt on the vehicle when the estimated distance is less than or equal to a fourth preset threshold and is greater than a fifth preset threshold.

2. The method according to claim 1, wherein the performing the semantic segmentation on the feature map through the neural network to obtain lane line probability maps of N lane lines comprises:
performing the semantic segmentation on the feature map through the neural network to obtain probability maps of N+1 channels, the N+1 channels respectively corresponding to the N lane lines and a background; and
obtaining the lane line probability maps of the N lane lines from the probability maps of the N+1 channels.

3. The method according to claim 2, wherein
when the value of N is 2, the N+1 channels correspond to a background, the left lane line, and a right lane line, respectively; or
when the value of N is 3, the N+1 channels correspond to the background, the left lane line, a middle lane line, and the right lane line, respectively; or
when the value of N is 4, the N+1 channels correspond to the background, a lane line at the left of the left lane line, the left lane line, the right lane line, and a lane line at the right of the right lane line, respectively.

4. The method according to claim 1, wherein the determining a region where the lane line is located according to the lane line probability map comprises:

selecting, for one lane line, pixel points having a probability value greater than a first preset threshold from the lane line probability map of the lane line;

performing maximum connected region search in the lane line probability map based on the selected pixel points to locate a set of pixel points belonging to the lane line; and determining the region where the lane line is located based on the set of pixel points belonging to the lane line.

5. The method according to claim 4, wherein the determining the region where the lane line is located based on the set of pixel points belonging to the lane line comprises:

determining a sum of the probability values of all the pixel points in the set of pixel points belonging to the lane line to obtain a confidence score of the lane line; and when the confidence score is greater than a second preset threshold, using the region where the set of pixel points is formed as the region where the lane line is located.

6. The method according to claim 1, further comprising: preprocessing the image comprising the vehicle traveling environment; and wherein the performing the semantic segmentation on the image comprising the vehicle traveling environment through the neural network comprises: performing, through the neural network, the semantic segmentation on an image obtained by the preprocessing, and/or wherein the determining, according to a traveling state of a vehicle and the lane line detection result, an estimated distance by which the vehicle travels out of a lane line and/or estimated time during which the vehicle travels out of the lane line comprises:

performing curve fitting on pixel points in the region where each of the lane lines is located, to obtain lane line information of each of the lane lines, wherein the lane line information comprises a distance from at least one point on the lane line to the vehicle; and determining the estimated distance by which the vehicle travels out of the lane line and/or the estimated time during which the vehicle travels out of the lane line according to the traveling state of the vehicle and the lane line information of the lane line.

7. The method according to claim 6, wherein the performing curve fitting on pixel points in the region where each of the lane lines is located, to obtain lane line information of each of the lane lines comprises:

selecting multiple pixel points from the region where one of the lane lines is located;

converting the multiple pixel points from a camera coordinate system where the camera is located into a world coordinate system, to obtain coordinates of the multiple pixel points in the world coordinate system; and performing curve fitting on the multiple pixel points in the world coordinate system according to the coordinates of the multiple pixel points in the world coordinate system, to obtain the lane line information of the lane line, and/or after obtaining the lane line information of the lane line, performing a filtering with respect to parameters in the lane line information of the lane line; and the determining the estimated distance by which the vehicle travels out of the lane line and/or the estimated time during which the vehicle travels out of the lane line according to the traveling state of the vehicle and the lane line information of the lane line comprises: determining the estimated distance by which the vehicle travels out of the lane line and/or the estimated time during which the vehicle travels out of the lane line according to the traveling state of the vehicle and lane line information of the lane line obtained by the filtering.

8. The method according to claim 7, wherein the performing a filtering with respect to parameters in the lane line information of the lane line comprises:

performing Kalman filtering on parameter values of the parameters in the lane line information according to the parameter values of the parameters in the lane line information and parameter values of parameters in historical lane line information of the lane line obtained based on a previous frame image, the previous frame image being a frame image with detection timing prior to that of the image in a video including the image.

9. The method according to claim 8, wherein before performing Kalman filtering on the parameter values of the parameters in the lane line information, the method further comprises:

selecting the lane line information, in which the parameter values of the parameters in the lane line information change with respect to the parameter values of corresponding parameters in the historical lane line information and differences between the parameter values of the parameters in the lane line information and the parameter values of the corresponding parameters in the historical lane line information are less than a third preset threshold, to serve as effective lane line information for Kalman filtering.

10. The method according to claim 6, wherein determining, according to the traveling state of the vehicle and the lane line detection result, the estimated distance by which the vehicle travels out of the lane line comprises:

determining an estimated distance between the vehicle and the lane line based on a position of the vehicle in a world coordinate system and the lane line information of the lane line, the traveling state of the vehicle comprising the position of the vehicle in the world coordinate system, and/or determining, according to the traveling state of the vehicle and the lane line detection result, the estimated time during which the vehicle travels out of the lane line comprises:

determining the estimated time during which the vehicle travels out of the lane line according to a speed of the vehicle, a position of the vehicle in a world coordinate system, and the lane line information of the lane line, the traveling state of the vehicle comprising the speed of the vehicle and the position of the vehicle in the world coordinate system.

11. The method according to claim 1, wherein the performing intelligent driving control on the vehicle according to the estimated distance and/or the estimated time comprises:

comparing the estimated distance and/or the estimated time with at least one predetermined threshold; and performing, when a result of the comparison satisfies one or more preset conditions, intelligent driving control corresponding to the satisfied one or more preset conditions, the intelligent driving control comprising: automatic driving control and/or assisted driving control.

12. The method according to claim 11, wherein the automatic driving control comprises any one or more of the following: braking, deceleration, traveling direction changing, lane line keeping, and driving mode switching control, and/or performing the assisted driving control on the vehicle comprises: performing lane line departure warning; or, performing lane line keeping prompt.

13. The method according to claim 11, wherein when there are multiple preset conditions, a degree of the intelligent driving control increases when a number of the corresponding multiple preset conditions increases.

14. The method according to claim 13, wherein the performing, when a result of the comparison satisfies one or more preset conditions, intelligent driving control corresponding to the satisfied one or more preset conditions comprises:
performing lane line departure prompt on the vehicle when the estimated time is less than or equal to a sixth preset threshold and is greater than a seventh preset threshold;
wherein the lane line departure warning comprises the lane line departure prompt; the fifth preset threshold is less than the fourth preset threshold, and the seventh preset threshold is less than the sixth preset threshold.

15. The method according to claim 14, wherein the performing, when a result of the comparison satisfies one or more preset conditions, intelligent driving control corresponding to the satisfied one or more preset conditions further comprises:
performing the automatic driving control and/or lane line departure alerting on the vehicle when the estimated distance is less than or equal to the fifth preset threshold; or
performing the automatic driving control and/or lane line departure alerting on the vehicle when the estimated time is less than or equal to the seventh preset threshold; or
performing the automatic driving control and/or lane line departure alerting on the vehicle when the estimated distance is less than or equal to the fifth preset threshold and the estimated time is less than or equal to the seventh preset threshold;
wherein the lane line departure warning comprises the lane line departure alerting.

16. The method according to claim 15, wherein the performing the automatic driving control and/or lane line departure alerting on the vehicle when the estimated distance is less than or equal to the fifth preset threshold comprises:
performing the automatic driving control and/or the lane line departure alerting on the vehicle when the estimated distances determined based on the image and a historical frame image are less than or equal to the fifth preset threshold, the historical frame image comprising at least one frame image with detection timing prior to that of the image in a video including the image; or
the performing the automatic driving control and/or lane line departure alerting on the vehicle when the estimated time is less than or equal to the seventh preset threshold comprises:
performing the automatic driving control and/or the lane line departure alerting on the vehicle when the estimated times determined based on the image and the historical frame image are less than or equal to the seventh preset threshold; or
the performing the automatic driving control and/or lane line departure alerting on the vehicle when the estimated distance is less than or equal to the fifth preset threshold and the estimated time is less than or equal to the seventh preset threshold comprises: performing the automatic driving control and/or the lane line departure alerting on the vehicle when the estimated distances determined based on the image and the historical frame image are less than or equal to the fifth preset threshold, and the estimated times determined based on the image and the historical frame image are less than or equal to the seventh preset threshold.

17. An electronic device, comprising:
a memory, configured to store a computer program; and
a processor, wherein, when the processor executes the computer program stored in the memory, the processor is caused to:
obtain a lane line detection result of a vehicle traveling environment by detecting the lane line in the vehicle traveling environment based on a neural network;
determine, according to a traveling state of the vehicle and the lane line detection result, an estimated distance by which the vehicle travels out of a lane line and/or estimated time during which the vehicle travels out of the lane line; and
perform intelligent driving control on the vehicle according to the estimated distance and/or the estimated time,
wherein when obtaining the lane line detection result by detecting the lane line in the vehicle traveling environment based on a neural network, the processor is further caused to:
perform semantic segmentation on an image comprising the vehicle traveling environment through the neural network to output a lane line probability map, the lane line probability map being used for representing a probability value that each of one or more pixel points in the image belongs to the lane line; and
determine a region where the lane line is located according to the lane line probability map, the region being included in the lane line detection result,
wherein when performing semantic segmentation on an image comprising the vehicle traveling environment through the neural network to output a lane line probability map, the processor is further caused to:
perform feature extraction on the image through the neural network to obtain a feature map; and
perform semantic segmentation on the feature map through the neural network to obtain lane line probability maps of N lane lines, a pixel value of each pixel point in the lane line probability map of each lane line representing the probability value that the corresponding pixel point in the image belongs to the lane line, and the value of N being an integer greater than zero, and
wherein when performing intelligent driving control on the vehicle according to the estimated distance and/or the estimated time, the processor is further caused to:
perform lane line departure prompt on the vehicle when the estimated distance is less than or equal to a fourth preset threshold and is greater than a fifth preset threshold.

18. A non-transitory computer-readable storage medium having a computer program stored thereon, wherein when the computer program is executed by a processor, the computer program causes the processor to:
obtain a lane line detection result of a vehicle traveling environment by detecting the lane line in the vehicle traveling environment based on a neural network;
determine, according to a traveling state of the vehicle and the lane line detection result, an estimated distance by which the vehicle travels out of a lane line and/or estimated time during which the vehicle travels out of the lane line; and perform intelligent driving control on the vehicle according to the estimated distance and/or the estimated time, wherein when obtaining the lane line detection result by detecting the lane line in the vehicle traveling environment based on a neural network, the computer program further causes the processor to:

perform semantic segmentation on an image comprising the vehicle traveling environment through the neural network to output a lane line probability map, the lane line probability map being used for representing a probability value that each of one or more pixel points in the image belongs to the lane line; and determine a region where the lane line is located according to the lane line probability map, the region being included in the lane line detection result, wherein when performing semantic segmentation on an image comprising the vehicle traveling environment through the neural network to output a lane line probability map, the computer program further causes the processor to:

perform feature extraction on the image through the neural network to obtain a feature map; and perform semantic segmentation on the feature map through the neural network to obtain lane line probability maps of N lane lines, a pixel value of each pixel point in the lane line probability map of each lane line representing the probability value that the corresponding pixel point in the image belongs to the lane line, and the value of N being an integer greater than zero, and wherein when performing intelligent driving control on the vehicle according to the estimated distance and/or the estimated time, the processor is further caused to:

perform lane line departure prompt on the vehicle when the estimated distance is less than or equal to a fourth preset threshold and is greater than a fifth preset threshold.

* * * * *